United States Patent [19]

Peplinski

[11] Patent Number: 4,926,700
[45] Date of Patent: May 22, 1990

[54] BLIND HOLE THREAD GAUGE

[76] Inventor: Alphonso Peplinski, 35534 Mound Rd., Sterling Heights, Mich. 48310

[21] Appl. No.: 329,270

[22] Filed: Mar. 27, 1989

[51] Int. Cl.[5] .................................................. G01L 5/24
[52] U.S. Cl. ..................................... 73/862.23; 73/761
[58] Field of Search ............ 73/862.21, 862.23, 862.27, 73/761, 847, 9; 33/199 R, 199 B

[56] References Cited

U.S. PATENT DOCUMENTS

| 2,441,608 | 5/1948 | Warner | 73/862.27 |
| 2,586,708 | 2/1952 | Petit | 73/761 |
| 3,096,643 | 7/1963 | Essenmacher | 73/761 X |
| 3,429,179 | 2/1969 | Bowen et al. | 73/761 X |
| 4,375,121 | 3/1983 | Sigmund | 73/862.23 X |

*Primary Examiner*—Charles A. Ruehl
*Attorney, Agent, or Firm*—Harness, Dickey & Pierce

[57] ABSTRACT

An apparatus and method that can automatically test whether a particular threaded blind hole has been properly formed. A nut driver, that can be a commercially available item is modified and acts to rotate a test plug within the blind threaded hole to be tested and monitors the torque upon the nut driver. If the monitored torque exceeds a predetermined maximum or is below a predetermined minimum torque value, this gives an indication that a particular blind hole is improper. A visual torque monitor gives a digital display of the torque reading at any given moment, so that a manual operator can monitor the torque readings and determine whether the limits are exceeded, or an electronic control can be used that acts to electrically monitor the torque readings and compare to the predetermined minimum and maximum readings. An electrical contact members acts to send a signal to the control mechanism that gives an indication that a given hole has been tested to a required depth and is proper up to that depth.

10 Claims, 1 Drawing Sheet

BLIND HOLE THREAD GAUGE

BACKGROUND OF INVENTION

This invention in general relates to a method and apparatus that is useful in gauging drilled threaded holes in order to determine whether they are properly made. In general, the apparatus comprises a plug that is driven into a thread hole that is to be tested and a torque monitor that displays the torque required to drive the plug into the threaded hole.

In modern production facilities, it is necessary to have a method for testing whether a newly-formed threaded hole has been properly made. With the modern emphasis on quality control, it is important that a production facility be able to quickly and accurately test that the threaded holes that have been formed in various machine parts are of proper depth, are not out of round, and are true. The prior art mainly relied on a go/no-go gauge that consisted of a threaded plug that was manually inserted into the threaded hole to be tested. The go/no-go gauge gets its name from its method of testing. The gauge would be turned into the threaded hole to be tested, and if the gauge would enter the hole easily without the manual operator having to apply undue torque, the operator would know that the hole being tested was proper. If, however, the manual operator could not get the test plug into the hole, or if the test plug entered far too easily and was sloppily received within the hole, or if the test plug required undue torque to get into the hole, the operator would know that the hole was improper and could reject that part.

These prior art methods are unsatisfactory for a variety of reasons. In general, they rely upon a manual operator's discretion as to whether or not the hole was proper. It was left up to the manual operator's discretion as to whether a hole may be too large, too big or what would constitute undue torque that would indicate that the threads were not true. In addition, with any hand-held item, there is the danger that the testing device itself was not being applied level with the part to be tested. If the testing device were being applied skewed from the part to be tested, a true hole could be rejected as being improper since the testing threads would be out of line from the tested threads. In addition, modern production facilities typically make great numbers of parts at any one time. It is desirable within modern production facilities that robotic devices be used for as many production steps as possible. The prior techniques required intensive manual attention and was thus inefficient and expensive.

It is an object of the present invention therefore to provide a blind hole thread testing apparatus and method that can give an objective indication of whether a tested hole is proper or not.

It is further an object of the present invention to provide a blind hole thread testing apparatus and method in which the testing apparatus is mounted so as to be constrained to be level with respect to the part that is being tested.

It is further an object of the present invention to provide a blind hole thread testing apparatus that can be entirely automated and which requires as few manual steps as possible. In addition to the above objectives, it is an object of the present invention to provide such a device that requires relatively few movable parts and is sturdy.

SUMMARY OF THE INVENTION

The present invention relates to a blind hole thread testing apparatus that utilizes a nut runner, that is, a power-driven bolt or screwdriver, to insert a test plug into a threaded hole that is to be tested. The nut runner is provided with a torque strain gauge that measures the torque between the nut runner motor and the driven nut runner and displays the torque on a digital read-out. By monitoring this read-out, either manually or automatically, a given part can be tested and improper threaded holes can be identified.

The present invention achieves these goals by using a nut runner that may be pneumatic driven, but is preferably electrically driven. A suitable nut runner is available from FED, Inc. in Madison Heights, Mich. These nut runners come equipped with a strain gauge and a transducer that is associated with a digital torque read-out. The transducer, strain gauge and torque read-out give a indication of the torque between the nut runner motor and the driven nut portion. Applicant has modified this standard nut runner by substituting a threaded test plug for the bolt or screw driver normally mounted in the chuck of the nut-runner mechanism. By doing this, Applicant achieves a device that can be used to test whether a newly made threaded hole is proper. In addition, Applicant mounts an electrical contact point on the driven portion of the nut driver that can be disposed so as to contact the machined part that contains the hole to be tested once the test plug has reached a given depth. This contact can act to end the testing of the threaded hole and cause the test plug to be driven in reverse and removed from the tested threaded hole. That is, the contact would give an indication that the test plug has entered the threaded hole to the required depth. Once the threaded hole has been tested to that depth, it may not be important to test the hole at any greater depths. For instance, if the threaded hole is to receive a bolt for a distance and the threaded hole is actually deeper than that first distance, is is not important if the threaded hole is true past this first distance. By providing this contact point, the present invention acts to save time by ending the testing automatically as soon as it can be assured that the hole has been properly manufactured to the required depth.

The present invention also discloses a method of mounting the machined part that will ensure that it is support level to the test apparatus. It is necessary that the mounting means for the part be adjustable in order to accommodate various size parts. In addition, since the mounting means is adjustable, it is also necessary to provide accurate indications that the adjustment has been made so that the mounting means remains level to the testing apparatus. If, for instance, the mounting means were slightly skewed with respect to the testing apparatus, the problems encountered by the prior art with inaccurate indications of improper thread holes might be encountered. For simplicity's sake, the mounting means has been disclosed as a series of adjustable nuts, slots and mounting C-clamps. However, it is to be understood that the most preferred embodiment would include machine-driven adjustable mounts that are automatically checked to assure that they are level to the desired planes.

The present invention can either be monitored manually or by a disclosed computer control. An operator may visually monitor the torque read-out in order to determine whether there are unacceptable conditions and that a particular threaded hole is improper, or a computer control may be utilized that acts to give an alarm when unacceptable conditions are encountered.

These and other objects and features of the present invention can be best understood upon a consideration of the attached specification and drawings, of which the following is a brief description thereof.

DETAILED DESCRIPTION OF THE INVENTION

Figure 1:
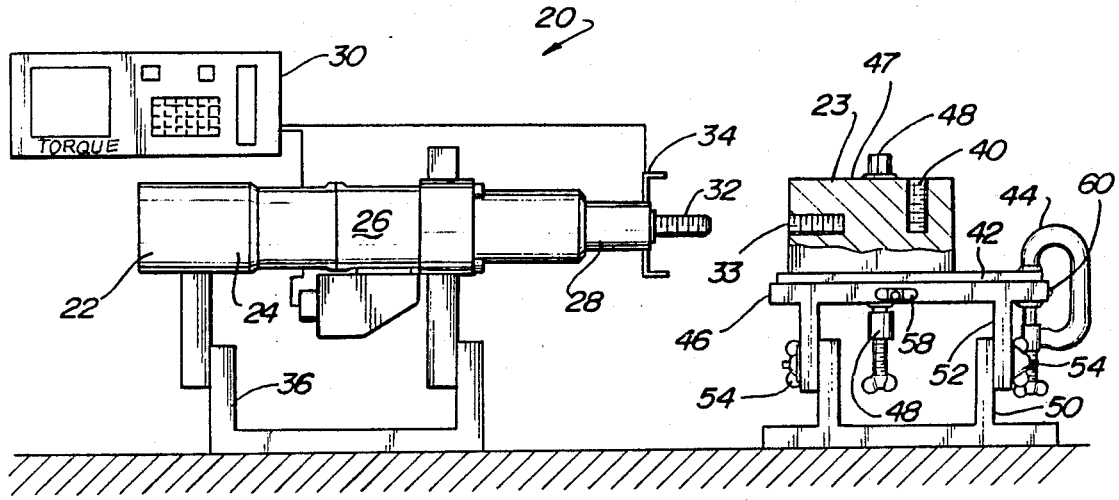
FIG. 1 is a view generally in cross-section showing the test apparatus of the present invention, the part to be tested and its associated mounting system.

The present invention includes a blind hole thread testing apparatus generally indicated at 20 that includes a modified nut driver 22 that is used to test a machined part 23. The nut driver 22 can be pneumatically driven, but is it preferable that it have an electric motor. The motor portion of the nut driver is shown at 24. The nut driver also includes a torque gauge and transducer 26 that measures the torque applied by the motor 24 on a driven portion 28. The torque gauge and transducer 26 send signals to a digital torque read-out 30 that will display the torque being applied at any given time. A nut driver such as has been disclosed up to this point is available, for instance, from FEC, Inc. in Madison Heights, Mich. Such a nut driver is typically mounted with either a screw driving head or a bolt-driving head and is used to drive bolts or screws into various parts. The torque monitor displays the torque required to drive in the screw or bolt and acts to monitor the torque required to insert the bolt or screw.

Applicant has modified this basic nut driver system by using a threaded test plug 32 that is mounted within the chuck of the nut driver 22. The threaded test plug 32 is manufactured to correspond to the desired dimensions of the thread hole to be tested 33. An electrical contact point 34 is mounted near the end of the driven portion 28 of the nut driver 22 and is placed so as to contact the machined part 23 when the threaded test plug 32 has been inserted into the holes to be tested 33 to the desired depth. Once the test plug reaches the desired depth within the hole to be tested 33, the contact 34 contacts the machined part 23 and sends a signal to the torque read-out 30 that indicates the hole is true to the necessary depth. The nut driver 22 is provided with a mount 36 that may or may not be adjustable and acts to hold the nut driver on a level axis with respect to the machined parts.

A simplified mounting system for the machined part 23 will now be disclosed. The mounting system must hold the machined part 23 level to the testing apparatus 20 so that an accurate indication can be given as to whether the hole 33 is true and of the proper dimensions. It is to be understood that there may be additional threaded holes, such as shown at 40, that may need to be subsequently tested. For this reason, it may be preferable to have a more complex mounting arrangement that would allow the part to be shifted to various positions automatically and retained level to the testing apparatus 20. The part 23 rests on a table 42 that is mounted by a C-clamp 44 to an adjustable support 46. The part 23 is fixed from the top 47 of the part to the adjustable mount 46 by a second C-clamp 48. The support 46 is adjustably mounted to a fixed support 50 by leg portions 52 extending downwardly from the support 46 and bolts 54 that ride in slots 56 formed in the legs 52.

Figure 2:
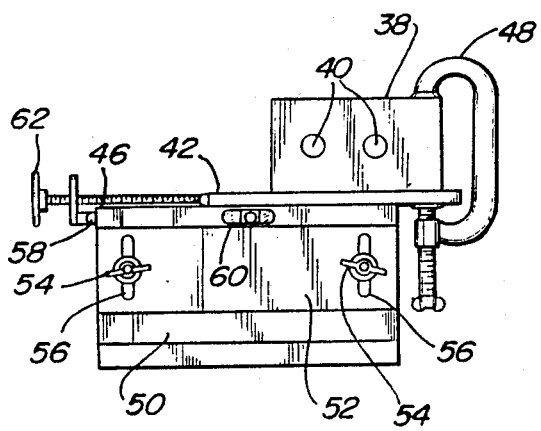
FIG. 2 is a view perpendicular to FIG. 1 and showing the part to be tested and its associated mounting system.

As can be seen in FIG. 2, by adjusting the wing nuts 54 within the slots 56, the height of the support 46 can be adjusted so that various size parts 23 can be accurately aligned with the testing apparatus 20. Some means of ensuring that the part is level to a fixed reference is required, and bubble levels 58, 60 are shown to achieve that feature. Also, a threaded bolt member 62 is shown that can adjust the lateral position of the table 42 upon the support 46.

It is to be emphasized at this point that this adjustable mounting system is disclosed for simplicity's sake only. It is to be understood that the preferred embodiment of this invention would have a more complex locating system such as a rotatable index table with a shot pin arrangement or other suitable locating system that would ensure that the part is accurately aligned with the testing apparatus 20.

Up to this time, an apparatus has been disclosed that gives an indication of whether or not a particular threaded hole has been properly formed. This apparatus 20 will give a digital read-out of the torque on the torque read-out member 30 and also may have contact member 34 that acts to provide a signal that the test plug 32 has been inserted to the required depth within the hole 33. A manual operator could visually monitor the torque read-out in order to determine whether a particular part has been properly formed. Alternately, an audible alarm could be employed with the system that gives an audible indication that a particular part is improper and would need to be discarded. The electrical contact 24 can act to end testing for either a manual or an automatic control.

Figure 3:
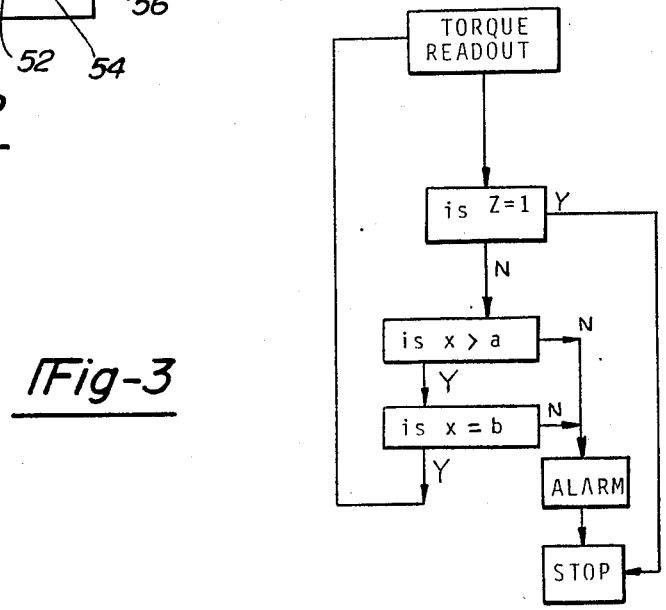
FIG. 3 is a simplified flowchart showing the logic that is utilized in determining whether a particular part is proper.

It is to be understood that an automatic testing system control could be easily constructed that would monitor the torque read-outs and give an indication that a particular part is improper. FIG. 3 shows a simplified flowchart of such an automatic control system. The flowchart begins with monitoring of the torque read-out. Once a discrete torque element has been read, a logic is applied to the torque read-out element. First, a variable Z is set to the status of the electrical contact 34. Z is initially set to zero and remains zero until the contact 34 contacts the part 23. The first question asked by the logic flowchart is: "Is Z equal to 1?" If Z is not equal to 1, then the contact 34 has not contacted the part 23, and the monitoring must continue. In that event, the flowchart continues. If, however, the answer to the question "Is Z equal to 1?" is yes, the flowchart goes immediately to a stop signal that can act to reverse the motor 22 and withdraw the threaded test plug 32 from the hole 33 that is to be tested. If the torque read-out has reached the point where Z is equal to 1, then it can be assumed that the part has been properly formed and this particular threaded hole 33 has passed inspection. While Z is not equal to 1, however, the logic flowchart must continue.

A variable X is next assigned to the torque quantity that has been read. The next logic question that is asked is: "Is X greater than A?". This element acts to ensure that the torque is at least a minimum value since if the torque is too low, it would indicate that the hole has been formed too large and must be rejected. A is a set constant that is a predetermined minimum torque that would indicate that the threaded hole 33 is of the proper dimensions. If the answer to the question "Is X greater than A?" is yes, the logic flowchart continues; if, however, the answer is no, the logic flowchart goes to an alarm step.

This alarm can include a visual or audio signal that would give an indication that the part being tested is improper and must be discarded. From the alarm step, the flowchart goes to the stop position where the motor is reversed and the test plug 32 is withdrawn from the tested hole 33. Note that in this simplified flowchart, once Z equals 1, the flowchart goes to the stop position by bypassing this alarm step and thus would give an indication that that particular part being tested is proper and has passed inspection.

If the answer to the question "Is X greater than A?" is yes, the next step is to test the torque X against a maximum torque read-out. A fixed constant B is also predetermined and set to a desired maximum torque. If this maximum torque B is exceeded, it would give an indication that the hole is either too small, the threads are untrue, or the hole itself is skewed away from its desired axis. If the answer to the question "Is X less than B?" is no, the flowchart then goes to the alarm position and follows the same procedure for the instance where the question "Is X less than A?" was answered in the negative. If, however, the question "Is X less than B?" is yes, the flowchart goes back to the start and the next torque element is analyzed. By continuously monitoring the torque readings, these logic steps can give an indication of whether or not a particular thread hole has been properly made, and whether the part will pass inspection.

After a part is tested and identified as proper or improper, the variable Z is re-set to O.

Simple logic, as is disclosed in FIG. 3, can be easily incorporated into a simple IC chip and integrated as part of the control of the blind hole testing apparatus 20. The simple electrical technology involved would be well within the ability of a worker in the art. By having such an automatic control, a single manual operator can monitor several sets of testing apparatus. By simply waiting for the audio alarm signal that would indicate a particular part is bad, the manual operator can easily monitor several testing systems.

A working embodiment of the present invention has been disclosed; however, it is to be understood that several modifications would be considered within the scope of this invention. As noted above, the part-mounting system might well be a more complex system, or various other types of nut drivers may be employed rather than the disclosed nut-driver. Several other modifications can be envisioned as being easily within the ability of a worker in the art and are considered part if this invention. The intended scope of the invention can be best understood from the appended claims.

I claim:

1. An apparatus for testing a threaded hole formed within a part, comprising:
    a motor;
    a driven rotary element driven by said motor;
    a torque gauge and transducer monitoring the torque between said motor and said driven rotary element;
    means for monitoring the torque readings from said torque gauge and transducer;
    a threaded plug element mounted within said driven rotary element and dimensioned so as to approximate predetermined desired dimensions of a given threaded hole that is to be tested; and
    control means that compare the monitored torque read-outs with predetermined minimum and maximum torque readings and identify whether a given threaded hole to be tested has been properly formed, a torque read-out that is less than the predetermined minimum or greater than the predetermined maximum identifying an improper threaded hole.

2. An apparatus as recited in claim 1, and further wherein an electrical contact member is mounted on said driven rotary element at a predetermined position that will cause said electrical contact member to generate a signal when said threaded plug element has tested a given threaded hole to be tested to a required depth, said signal identifying the threaded hole as properly formed.

3. An apparatus as recited in claim 2, and further wherein said driven rotary element has a standard chuck element at a position opposite said motor and said threaded plug element is received within said chuck element so as to extend outwardly of said chuck element; and
    wherein said electrical contact member is mounted on said rotary driven element on or near said chuck element and said electrical contact member has contact points that extend outwardly away from said chuck element in the same direction as said threaded plug element extends from said chuck element so that said contact points will contact the part within which the given threaded hole to be tested has been formed, when the threaded plug element has been inserted within the given threaded hole to be tested to a required depth.

4. An apparatus as recited in claim 3, and further wherein an automatic control acts to monitor the torque readings and the electrical contact member and will give an alarm indication if a given hole to be tested is shown to be improper, and upon determining that a given hole to be tested is either proper or improper, will stop the motor and reverse it, thus withdrawing the threaded plug element from the given hole to be tested.

5. An apparatus as recited in claim 4, and further wherein a part mounting means is provided for adjustably mounting the position of the part;
    a mounting system is provided for mounting the entire testing apparatus; and
    said part mounting system allows said part to be adjustably mounted so that various size parts can be aligned with said threaded plug element of said testing apparatus.

6. An apparatus as recited in claim 2, and further wherein an automatic control acts to monitor the torque readings and the electrical contact member and will give an alarm indication if a given hole to be tested is shown to be improper, and upon determining that a given hole to be tested is either proper or improper, will stop the motor and reverse it, thus withdrawing the threaded plug element from the given hole to be tested.

7. A method of testing whether a blind hold thread has been properly formed, comprising the steps of:
    mounting a test plug that has been dimensioned so as to approximate the desired dimensions of a given blind hole thread to be tested upon a motor that will act to rotate the test plug within a give hole to be tested;

driving the test plug into a given blind hole that is to be tested;

providing a torque gauge that will act to monitor the torque between the motor and the rotary driven test plug;

monitoring the torque read-outs from the torque gauge and transducer; and comparing the torque read-outs with predetermined minimum and maximum torque readings that give an indication whether a given hole to be tested has been properly made or not.

8. A method as recited in claim 7, and further comprising the step of providing an electrical contact means that will provide an electrical signal when the test plug has tested a given hole to be tested and shown it to be properly made to a required depth.

9. A method as recited in claim 8, and further comprising the step of providing a signal to stop the motor and reverse the motor, thus withdrawing the test plug from a given hole to be tested upon determination that either the torque reading is not within the predetermined minimum and maximum readings or that the electrical contact has given an indication that the hole is proper to the required depth.

10. A method as recited in claim 9, and further including the step of providing an alarm signal if it is determined that the torque reading is not within the predetermined minimum and maximum torque readings.

* * * * *